US008667118B2

(12) United States Patent
Takemura (10) Patent No.: US 8,667,118 B2
(45) Date of Patent: Mar. 4, 2014

(54) COMPUTER SYSTEM, PERFORMANCE MEASURING METHOD AND MANAGEMENT SERVER APPARATUS (75) Inventor: Toshinori Takemura, Tokyo (JP)

(73) Assignee: NEC Corporation, Tokyo (JP)

(*) Notice: Subject to any disclaimer, the term of this patent is extended or adjusted under 35 U.S.C. 154(b) by 1730 days.

(21) Appl. No.: 11/806,165

(22) Filed: May 30, 2007

(65) Prior Publication Data

US 2007/0283009 A1  Dec. 6, 2007

(30) Foreign Application Priority Data

May 31, 2006 (JP) ................... 2006-151155

(51) Int. Cl.
G06F 15/173 (2006.01)
(52) U.S. Cl.
USPC ........................................... 709/224
(58) Field of Classification Search
USPC ........................................... 709/224
See application file for complete search history.

(56) References Cited

U.S. PATENT DOCUMENTS

| 5,949,976 | A  | * | 9/1999  | Chappelle  | 709/224 |
| 6,760,684 | B1 | * | 7/2004  | Yang et al. | 702/182 |
| 7,401,324 | B1 | * | 7/2008  | Dmitriev   | 717/130 |
| 2003/0225549 | A1 | * | 12/2003 | Shay et al. | 702/182 |
| 2004/0176040 | A1 | * | 9/2004  | Thornton et al. | 455/67.11 |
| 2005/0120341 | A1 | * | 6/2005  | Blumenthal et al. | 717/158 |
| 2006/0036724 | A1 | * | 2/2006  | Iizuka et al. | 709/223 |
| 2006/0224725 | A1 | * | 10/2006 | Bali et al. | 709/224 |
| 2007/0041330 | A1 | * | 2/2007  | Bostica et al. | 370/252 |
| 2008/0184229 | A1 | * | 7/2008  | Rosu et al. | 718/1 |
| 2008/0215796 | A1 | * | 9/2008  | Lam et al. | 711/100 |
| 2009/0122706 | A1 | * | 5/2009  | Alfano et al. | 370/237 |
| 2009/0138541 | A1 | * | 5/2009  | Wing et al. | 709/201 |
| 2009/0265715 | A1 | * | 10/2009 | Erlingsson et al. | 719/310 |
| 2009/0300605 | A1 | * | 12/2009 | Edwards et al. | 718/1 |

FOREIGN PATENT DOCUMENTS

| JP | 10-283210   | 10/1998 |
| JP | 2005-115653 | 4/2005  |
| JP | 2006-018710 | 1/2006  |

* cited by examiner

Primary Examiner — Karen Tang
(74) Attorney, Agent, or Firm — Foley & Lardner LLP

(57) ABSTRACT

In a computer system including physical servers on which virtual servers for business use operate and a management server communicably connected to the physical servers, the management server requests physical servers that are targets of performance measurement to activate a performance measurement virtual server based on a virtual server image including an operating system and a performance measurement program. Performance information measured by the performance measurement virtual server activated on each physical server is fed to the management server. It is therefore possible in the communication system to measure a margin processing performance of each physical server according to the same criterion.

13 Claims, 5 Drawing Sheets

| VIRTUAL SERVER IMAGE ID | OS NAME | COMPATIBLE APPLICATION NAME |
|---|---|---|
| ⋮ | ⋮ | ⋮ |
| VM21 | ○×○ | ×××,△△△ |
| ⋮ | ⋮ | ⋮ |

FIG. 7

COMPUTER SYSTEM, PERFORMANCE MEASURING METHOD AND MANAGEMENT SERVER APPARATUS

This application is based upon and claims the benefit of priority from Japanese patent application No. 2006-151155, filed on May 31, 2006, the disclosure of which is incorporated herein in its entirety by reference.

BACKGROUND OF THE INVENTION

1. Field of the Invention

The present invention pertains to a computer system for operating virtual servers on physical servers, and in particular, to a method of and an apparatus for measuring a margin of processing performance or capacity of each physical server.

2. Description of the Related Art

There has been known a virtual server technique to use one computer virtually as a plurality of servers by making a plurality of operating systems (OS) operate on one single physical server, i.e., a computer such as a workstation or a personal computer. Products employing such technique include "VMWare ESX Server" of VMWare, "VirtualServer" of Microsoft, and "Xen" of XenSource. According to these products, a new virtual server can be created on a physical server when a virtual server creation command is issued. Articles regarding the technique to generate a virtual server on a physical server include, for example, Japanese Patent Application Laid-Open No. 2005-115653 (document 1).

There also exists a known technique for use in a distributed processor environment including a plurality of physical servers communicably connected via a network to each other wherein a virtual server is automatically or manually moved from a first physical server to a second physical server depending on, for example, utilization efficiency of a resource or workload. In this connection, for example, document 1 and Japanese Patent Application Laid-Open No. 10-283210 (document 2) describe such server moving technique. "Vmotion" of WMWare and "migration" of Xen provide a virtual server moving function.

To create a new virtual server on a physical server or to move a virtual server from a first physical server to a second physical server in the virtual server environment including a plurality of physical servers, a check is made to determine whether the physical server in which the virtual server is to be created or the second physical server as the destination of the virtual server includes a free resource available for the virtual server. If such resource is present therein, the creation or the movement of the virtual server is carried out. Reference is to be made to, for example, paragraphs 33 to 35 of document 1, and paragraph 20 of document 2.

According to a conventional technique regarding the measurement of performance of a physical server as described in, for example, Japanese Patent Application Laid-Open No. 2006-18710 (document 3), a management computer installs a performance measurement program in a plurality of management target computers and executes the program therein to collect results of execution of the program. According to a well-known technique to make a comparison with respect to performance between two computers including mutually different Central Processing Units (CPU) and Operating Systems (OS), a benchmark program is executed on both computers to compare results of the program execution with each other. Also in a virtual server environment including a plurality of physical servers, there exists a situation in which the benchmark of each physical server is employed as described in, for example, paragraph 17 of document 1. Additionally, as described in paragraph 31 of document 1, each virtual server operating on the physical servers executes a program other than the application programs to gather performance data items such as a CPU utilization ratio and a period of time required to execute predetermined calculation processing. The results of the program execution are delivered to a management server together with a virtual server IDentifier (ID) and data of time associated with the program execution. The results and these data pieces are stored in a database. In accordance with document 1, the performance data items recorded at respective points of time of each virtual server are adopted to determine whether a virtual server in consideration was in operation at the points of time.

As described above, if the physical server includes an available resource equal to or more than a resource required for the virtual server to be created or the virtual server to be moved, it is assumed that the physical server has a margin of processing performance to operate the virtual server. However, in physical servers mutually having almost the same resource margin, it is not necessarily guaranteed, due to a variety of CPUs and operating systems (OS), and the number and a variety of virtual servers in operation, that the virtual server initiated as a new server operates with expected performance on the physical servers. Therefore, a new performance measuring method is required to draw a comparison with respect to the processing performance margin between the physical servers according to a criterion other than the resource margin.

A benchmark test for each physical server is effective to make a comparison in performance between the physical servers. However, in a virtual server environment in which the host operating system varies in each physical server, in order to conduct the performance measurement according to one and the same criterion, it is required to prepare a common benchmark program for different host operating systems for the following reason. When benchmark programs differ, the measurement criterion and precision varies even though the object of measurement is the same. This leads to a disadvantage that the results of the benchmark test cannot be directly compared with each other.

According to document 1, each virtual server operating on each physical server periodically executes a performance measurement program other than the application programs to collect results of the program execution. However, the results only serve as an indication of performance of the virtual server, but cannot be an indication of a margin of the processing performance of the physical server. Moreover, the virtual servers operating on the respective physical servers may not employ the same operating system, and hence it is not guaranteed that the measurement is carried out according to the same criterion.

SUMMARY OF THE INVENTION

An exemplary object of the present invention is to provide a method and an apparatus making it possible in a virtual server environment to operate virtual servers on physical servers to measure a margin of processing performance of each physical server according to the same criterion.

In accordance with an exemplary aspect of the present invention, there is provided a management server apparatus communicably connected to physical servers on which a virtual server operates, including a virtual server initiating module that issues a request to physical servers that are targets of performance measurement to activate a performance measurement virtual server for performance measurement based on a virtual server image including an operating system and a performance measurement program, and a performance information receiving module that receives from each physical server performance information measured by the performance measurement virtual server.

According to another exemplary aspect of the present invention, there is provide a computer system including physical servers on which a virtual server operates and a management server apparatus communicably connected to the physical servers. The management server includes a virtual server initiating module that issues a request to at least one physical server selected from the plural physical servers that are targets of performance measurement to activate a performance measurement virtual server for performance measurement based on a virtual server image including an operating system and a performance measurement program, and a performance information receiving module that receives from each physical server performance information measured by the performance measurement virtual server.

According to another exemplary aspect of the present invention, there is provided a first performance measuring method of measuring, by a computer communicably connected to physical servers on which a virtual server operates, performance of the physical servers. The method includes a first step of issuing a request by the computer to physical servers that are targets of performance measurement to activate a performance measurement virtual server for performance measurement based on a virtual server image including an operating system and a performance measurement program, and a second step of receiving from each physical server performance information measured by the performance measurement virtual server.

BRIEF DESCRIPTION OF THE DRAWINGS

The objects and features of the present invention will become more apparent from the consideration of the following detailed description taken in conjunction with the accompanying drawings in which.

DESCRIPTION OF EXEMPLARY EMBODIMENTS

When a performance measuring virtual server based on a virtual server image including an operating system and a performance measurement program is activated on at least one physical server, the performance measurement program on a physical server produce the same performance information as long as the physical servers are substantially equal to each other. However, the performance information as a result of the measurement varies if the configuration and the load such as an amount of the available memory, an available CPU utilization ratio, an available network band, a host operating system, a CPU, and the number and kinds of virtual servers in operation differ between the physical servers. In this situation, since the performance measuring program and the operating system, i.e., the guest operating system are the same for the physical servers, it is to be understood that the difference between the measurement results has been caused by the difference in the margin of processing performance between the physical servers. Therefore, it is possible to measure the margin of processing performance of each physical server according to the same criterion.

To measure the processing performance margin of a physical server for a virtual server to be allocated to one of the physical servers, it is possible to activate a performance measurement virtual server on all measurable physical servers. However, in this situation, it is meaningless to set as a measurement target a physical server that cannot reserve a resource required for the virtual server to be allocated as above. That is, only the physical servers each of which having a resource required for the virtual server to be allocated are desirably selected.

Similarly, to measure the processing performance margin of a physical server for a virtual server to be allocated to either one of the physical servers, it is favorable to employ a performance measurement virtual server including an operating system substantially equal to a guest operating system of the virtual server to be allocated or a performance measurement virtual server including a measurement program matching with the characteristic of an application to be executed by the virtual server to be allocated. This is because there are obtained measured values more suitably reflecting the performance attained in the actual execution of the program. Therefore, it is desirable to prepare virtual server images between which at least the operating system or the performance measuring program varies so that a user selects a virtual server image suitable for the resource including the operating system and the application of the virtual server to be allocated.

First Exemplary Embodiment

Figure 1:
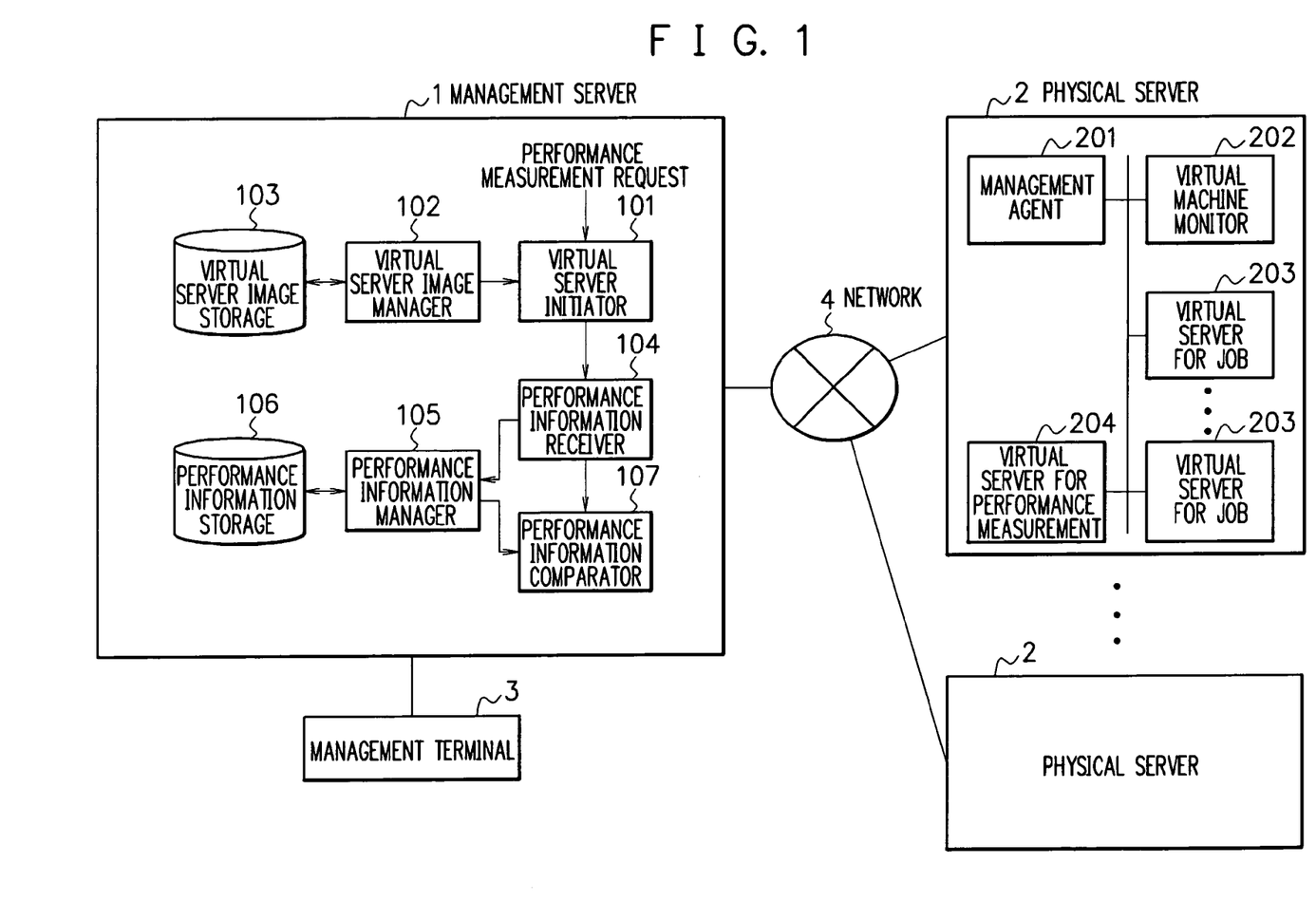
FIG. 1 is a schematic block diagram showing a configuration of a first embodiment.

Referring to FIG. 1, the first embodiment includes a management server 1, at least one physical server 2, a management terminal 3, and a network 4.

The server 1 is a computer to measure performance of the respective physical servers 2 and includes a virtual server initiator 101, a virtual server image manager 102, a virtual server image storage section 103, a performance information receiver 104, a performance information manager 105, a performance information storage section 106, and a performance information comparator 107.

The storage section 103 is a storage medium such as a hard disk to store virtual server images for performance measurement. A performance measurement virtual server image is a file made from the contents of a disk of a virtual server, a performance measuring program being installed in the disk of the virtual server. The file includes an operating system and a performance measuring program to operate thereon.

The performance measuring program in the virtual server image for performance measurement measures any performance information only if the information is data representing performance of a virtual server. This program may be, for example, a benchmark program available in the market. The performance measurement program may be, for example: Standard Performance Evaluation Corporation (SPEC) capable of measuring various performance items such as performance of a CPU, Jave (registered trademark), and a Web server; Transaction Processing Council (TPC) to measure performance of transaction processing; or "netperf" capable of measuring performance of a network. It is also possible to employ a new benchmark program created particularly for exemplary embodiments. Any other performance measuring program may also be adopted. The performance measurement program in the virtual server image is initiated on a virtual server and measures information of predetermined performance to send the measured performance information to the server 1.

The image manager 102 is a module that manages and stores the virtual server images for performance measurement in the storage section 103.

The initiator 101 reads out, when the terminal 3 issues a performance measurement request, a virtual server image for performance measurement via the manager 102 from the storage section 103 to distribute images via the network 4 to the physical servers 2. In the first exemplary embodiment, the performance measurement request designates physical servers as targets of the performance measurement. The initiator 101 also includes a function to halt and to discard a virtual server for performance measurement activated on a physical server 2.

The receiver 104 is a module that receives performance information fed from the performance measurement program of the virtual server for performance measurement activated on a physical server 2.

The performance information manager 105 is a module that stores the performance information from the receiver 104 in the storage section 106 to manage the stored information. The performance information is grouped with respect to each physical server.

The storage section 106 is a storing medium such as a hard disk to store the performance information of each physical server 2.

The comparator 107 is a module to read out via the manager 105 the performance information of each physical server 2 from the storage section 106 to draw a comparison of information items between the physical servers 2.

The terminal 3 is a terminal module or an operator's console including an input device such as a keyboard and a mouse, and an output device such as a display. The terminal 3 supports a function to connect to the server 1 to deliver to the server 1 a performance measurement request or the like inputted from the system manager, and a function to receive via the server 1 a state of execution of various operations to deliver the state to the output device.

A physical server 2 is a computer operating under control of programs and includes a management agent 201, a virtual machine monitor 202, at least one virtual server for business use 203, and a performance measurement virtual server 204.

The management agent 201 includes a function to request, in response to an order from the initiator 101 of the server 1, the virtual machine monitor 202 to create or to discard a virtual server 204.

The virtual machine monitor 202 includes a function to distribute hardware resources such as a CPU and a memory of the physical server 2 to a virtual server 203 and the performance measurement virtual server 204, and to control the operation to create or to discard the virtual servers 203 and 204.

The virtual server 203 is a logical server to execute an application program. Application programs may include programs respectively providing various services such as a shopping service, a blog service, and an accounting service.

The performance measurement virtual server 204 is a logical server generated according to a performance measurement virtual server image distributed from the server 1 and executes a performance measurement program.

The network 4 is employed to connect the server 1 to physical servers 2. Although the terminal 3 is not coupled with the network 4 in FIG. 1, the terminal 3 may be linked via the network 4 with the server 1.

Description will now be given of specific examples of the server 1, physical servers 2, the management terminal 3, and the network 4 that function as above.

The server 1 includes a module for connecting to a network such as Ethernet (registered trademark) and can be implemented using a computer on which an operating system such as Windows (registered trademark) or Linux operates. The initiator 101, the receiver 104, and the comparator 107 may be realized as software modules on the operating system. The image manager 102, the image storage section 103, the information manager 105, and the information storage section 106 may be implemented using existing database items or by use of software modules that store a virtual server image and performance information in a memory.

The physical server 2 includes a module for connecting to a network such as Ethernet and is implemented using a virtual machine monitor 202 such as VMware GSX Server, VMware ESX Server, or Xen, and at least one virtual server 203 (204) controlled by the virtual machine monitor 202. On each virtual server 203, an operating system such as Windows Server, Red Hat Enterprise Linux, Solaris, or HP-UX operates. On such operating systems, operates: web servers such as Internet Information Server and Apache HTTP Server; application containers such as Enterprise Java (registered trademark) Beans (EJB); and application programs of database management systems such as Oracle, DB2, and MySQL. In the performance measurement virtual server 204, a particular operating system such as WindowsXP operates. On the operating system, a performance measurement program such as SPEC operates.

The configuration of the management agent 201 on a physical server 2 depends on the type of the virtual machine monitor 202. If the virtual machine monitor 202 such as VMware GSX Server that runs on a host operating system is used, the agent 201 operates as software on the host operating system. If the monitor 202 such as VMware ESX Server and Xen that do not require a host operating system is used, the agent 201 operates as a software module in the monitor 202 or as a process on a privileged virtual server such as Xen Domain0.

The management terminal 3 in the specific example includes an input module, a Liquid-Crystal Display (LCD) module, and a coupling module to connect to the server 1. A typical example of the terminal 3 is a Personal Computer (PC) on which Windows operates and connects via a Web browser of, for example, Internet Explorer to connect to the server 1.

The network 4 may include a Local Area Network (LAN) using Ethernet and the Internet.

Referring next to a flowchart, description will be given in detail of an operation of the embodiment.

Assume that none of the virtual servers is operating on any physical server 2, or one or more virtual servers are operating and each of these virtual servers is a virtual server for business use 203. That is, none of the performance measurement virtual servers 204 is operating in any physical server 2.

Description will now be given of an operation in this state wherein the system manager inputs from the terminal 3 a performance measurement request including physical servers 2 as target of measurement.

Figure 2:
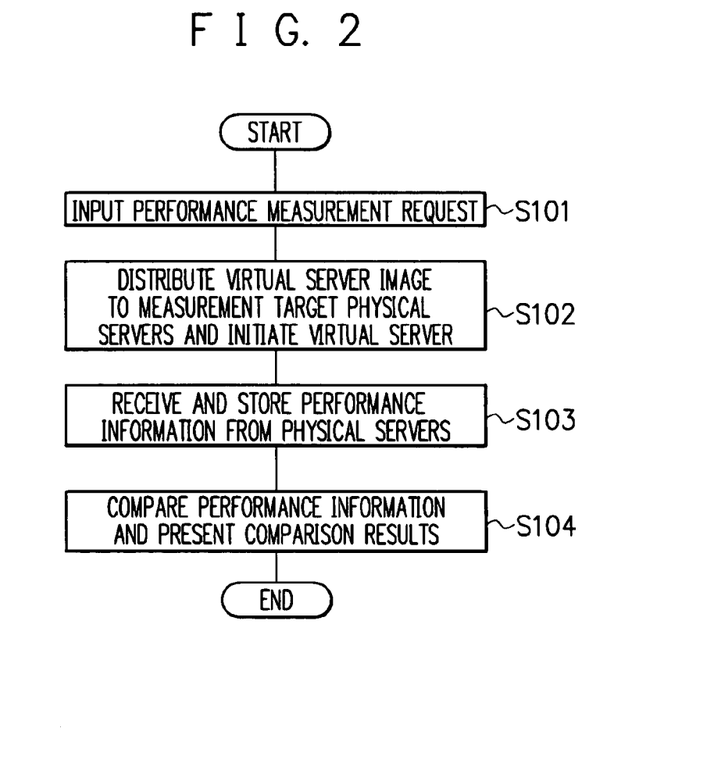
FIG. 2 is a flowchart showing an example of processing in a management server in the first embodiment.

The request from the terminal 3 is fed to the virtual server initiator 101 of the server 1 (step S101 of FIG. 2). The initiator 101 reads out via the virtual server image manager 102 from the image storage section 103 a virtual server image for performance measurement including an operating system and a performance measurement program. The initiator 101 delivers the server image to physical servers 2 designated by the request via the network 4 to boot virtual server image (step S102). Thereafter, the initiator 101 notifies the performance information receiver 104 of a list of identifiers of the physical servers 2.

In each of the physical servers 2, the management agent 201 receives a virtual server image from the server 1 and requests the virtual machine monitor 202 to activate a virtual server on the basis of the server image. Assume in this situation that the physical servers 2 equally allocate resources (a memory and a CPU utilization ratio) to the virtual servers 204 for performance measurement. In response to the request from the agent 201, the machine monitor 202 generates and initiates a performance measurement virtual server 204 on the physical server 2. The virtual server 204 thus activated executes the performance measurement program to measure predetermined performance information and feeds the measurement result together with the identifier of the physical server 2 via the network 4 to the receiver 104 of the server 1.

Figure 3:
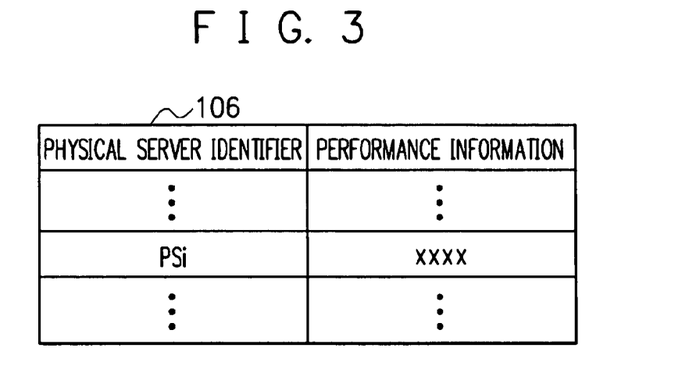
FIG. 3 is an explanatory diagram showing information items stored in a performance information storage module of the first embodiment.

The receiver 104 then receives the information from the virtual server 204 to store the information via the performance information manager 105 in the storage section 106 for each physical server 2. For example, as can be seen from FIG. 3, the identifier of the physical server 2 and the performance information thereof are stored as an entry in the storage section 106. If the performance information has been received from the physical servers 2 indicated from the initiator 101, the receiver 104 delivers a notification that the performance information has been received from the physical servers 2 to the performance information comparator 107.

On receiving the notification, the comparator 107 reads the performance information of each physical server 2 via the manager 105 from the storage section 106 to compare the performance information of the physical servers with each other to display comparison results on the screen of the terminal 3 (step S104). For example, if the performance information is a period of time used for predetermined processing, the comparator 107 presents on the screen, as comparison results, performance information having the shortest processing time and an identifier of the physical server 2 associated with the information. The comparison of the results may be conducted in various ways. For example, the performance information items are presented in a graph.

Description will next be given of an advantage of the first embodiment.

In accordance with the embodiment, in an environment of virtual servers wherein at least one virtual server 203 operates on physical servers 2, a margin of processing capacity can be measured for each physical server 2 at a predetermined point of time according to one and the same criterion for the following reason. Using one and the same virtual server image including an operating system and a performance measurement program, a virtual server 204 for performance measurement is initiated on servers 2 to measure the performance information.

Although the performance measurement request is supplied from the terminal 3 in the embodiment, the system may be configured such that a program operating on the server 1 issues the request to the virtual server initiating module 101. In this case, the performance information comparator 107 may notify the program of the comparison results.

Also, the performance measurement virtual server 204 activated on each physical server 2 carries out the measurement of performance information only once in the first embodiment. However, the measurement may be periodically conducted so that the measurement results are sent to the server 1 each time the measurement is accomplished.

Second Exemplary Embodiment

Figure 4:
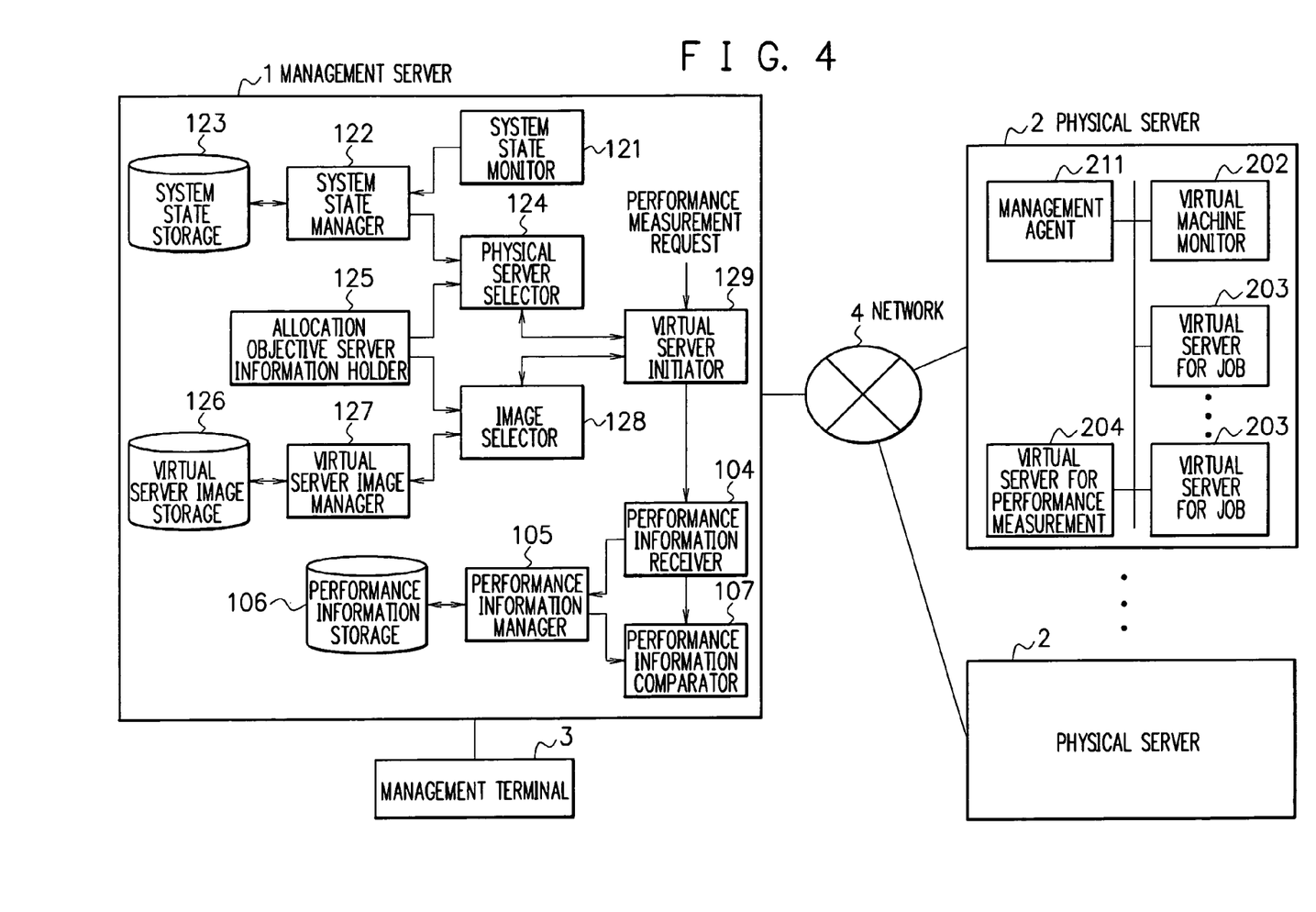
FIG. 4 is a block diagram showing structure of a second embodiment.

Referring to FIG. 4, the second embodiment of the present invention differs from the first embodiment shown in FIG. 1 in that the management server 1 includes, in place of the image manager 102 and the image storage section 103, a system state monitor module 121, a system state manager 122, a system state storage section 123, a physical server selector 124, an allocation objective server information holding module 125, a virtual server image storage section 126, a virtual server image manager 127, an image selector 128, and a virtual server initiator 129. Moreover, each physical server 2 includes a management agent 211 in place of the management agent 201.

The module 121 collects various information about each physical server 2 and various information about resources of each virtual server on the physical server from the management agent 211 of the physical server 2. The collected information mainly includes performance information and workload information. The performance information includes information regarding hardware of the physical server 2 such as the number of CPUs mounted thereon, the clock rate of the CPU, the amount of physical memory, a network band, and a hard disk capacity and information of allocation to each virtual server such as hardware resources of the physical server 2 allocated to virtual servers. The workload information includes information about each of the physical servers and each of the virtual servers such as a CPU utilization ratio, a memory use ratio, the amount of available memory, a network utilization ratio, an available hard disk capacity, and information about failure.

The manager 122 stores the information gathered by the monitor module 121 in the storage section 123 to manage the information.

The storage section 123 is a recoding medium to store therein the information collected by the monitor module 121 and may be a hard disk.

The virtual server image storage section 126 is a recording medium to store therein various kinds of virtual server images for performance measurement and may be a hard disk.

Figure 5:
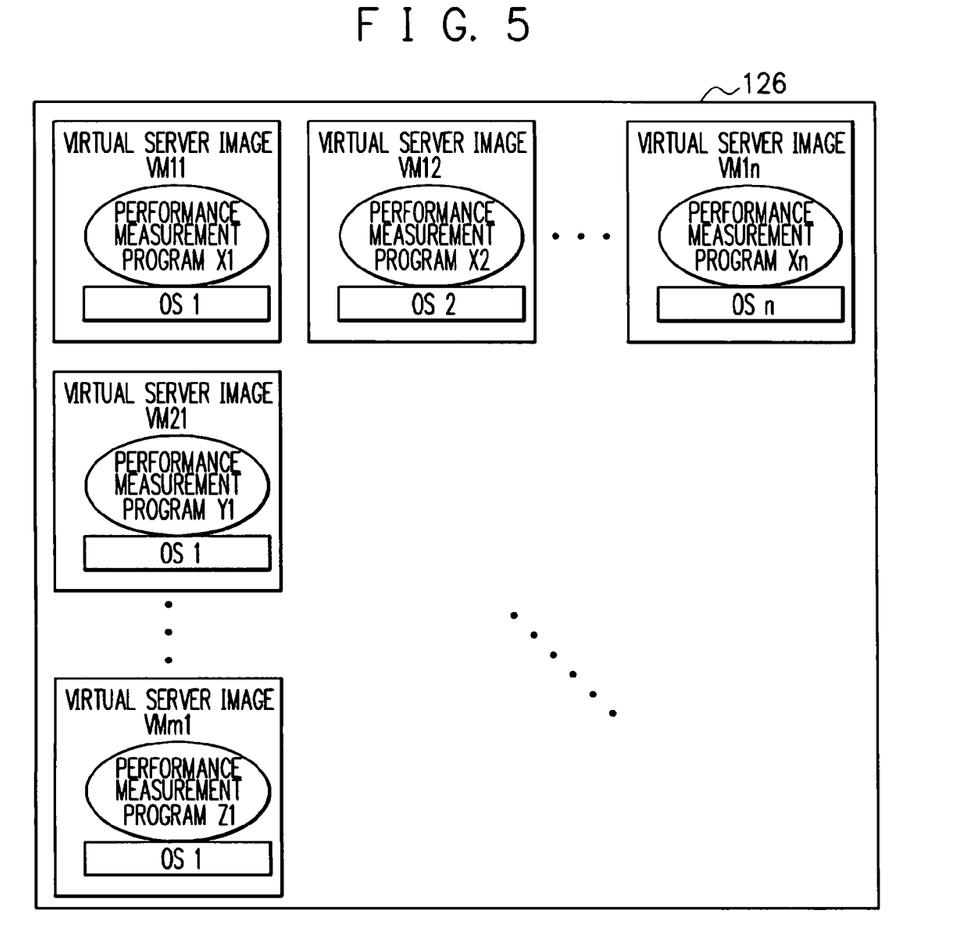
FIG. 5 is an explanatory diagram showing items stored in a virtual server image storage module of the second embodiment.

FIG. 5 is an explanatory diagram showing kinds of virtual server images stored in the storage section 126. The storage section 126 stores therein various types of virtual server images. Virtual servers of these images measure the same performance information but operate on different operating systems. For example, in FIG. 5, virtual server images VM11, VM12, . . . , VM1n are images of virtual servers in which performance measurement programs measure the same performance information on different types of operating systems. The storage section 126 also stores various types of virtual server images to measure different kinds of performance information on the same operating system. In FIG. 5, for example, virtual server images VM11, VM21, . . . , VMm1 are images of virtual servers in which performance measurement programs measure different kinds of performance information on one and the same operating system.

The performance information measured by the performance measuring program in the virtual server image for performance measurement is not particularly restricted as far as the information includes data representing performance of a virtual server. As the performance measuring program, there may be adopted, for example, SPEC, TPC, and netperf described above as well as a benchmark program produced particularly for the exemplary embodiments. Other performance measurement programs may be used. The performance measurement program in the virtual server image is executed on a virtual server to measure predetermined performance information and delivers the measured performance information to the server 1.

The virtual server image manager 127 is a unit that stores various types of virtual server images for performance measurement in the storage section 126 to manage the virtual server images.

The module 125 keeps resource information of a virtual server to be allocated to a particular physical server 2. The resource information includes, for example, the amount of memory, the number of CPUs required for applications that operate in the virtual server, the type of the guest operating system, and kinds of application programs that operates in the virtual server. In the second embodiment, the resource information is manually stored in the module 125 by a system manager from the management terminal 3.

The physical server selector 124 refers to the module 125 and the storage section 123 to select, as a physical server 2 of which performance is to be measured, a physical server 2 including resources required for an allocation objective virtual server. For example, if an application operating on the virtual server has a characteristic to require CPU performance, and a performance item requires a physical server 2 with four CPUs mounted thereon, the selector 124 refers to the configuration information stored in the storage section 123 to select a physical server 2 including four CPUs. Similarly, if the allocation objective virtual server requires an amount of memory equal to or more than one Giga Bytes (GB), the physical server selector 124 refers to the configuration information and the load information in the system state storage section 123 to select a physical server 2 including the available memory having an amount of memory equal to or more than one Giga Bytes (GB).

The image selector 128 selects a virtual server image suitable for the performance measurement from various kinds of performance measurement virtual server images stored in the storage section 126 to dispatch a virtual server whose resource information is held in the module 125. In the second embodiment, the selector 128 selects a virtual server image on the basis of an operating system type and an application type. Specifically, the server image includes the same type of operating system as that of the allocation objective virtual server and a performance measurement program to measure performance information associated with the application type. For example, if the allocation objective virtual server is a virtual server for an application to execute a Web server, since the application has a characteristic to attach importance to the CPU performance and the network I/O performance, the selector 128 selects a virtual server image including a performance measurement program to measure the CPU performance and the network I/O performance.

Figure 6:
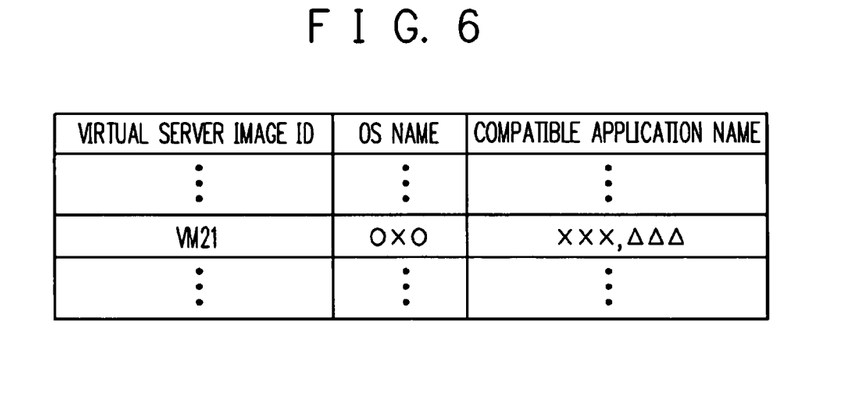
FIG. 6 is a diagram showing a correspondence table in an image selector of a management server in the second embodiment.

To select a virtual server image according to an operating system type and an application type, the image selecting module 128 includes a correspondence table as shown, for example, in FIG. 6. For each virtual server image stored in the storage section 126, the table includes an identifier thereof, an operating system name, and a compatible application name. The compatible application name field includes a list of applications suitable to measure performance using the virtual server 204 of a virtual server image.

The virtual server initiator 129 calls, at reception of a performance measurement request issued from the terminal 3, the physical server selector 124 to determine at least one physical server 2 for the performance measurement. The initiator 129 also calls the image selecting module 128 to determine a virtual server image for performance measurement and distributes the virtual server image for activation thereof via the network 4 to the physical server 2 thus determined. The server initiator 129 also includes a function to halt and to discard the virtual server 204 activated on the physical serve 2.

The monitor 121, the selector 124, the selector 128, and the initiator 129 can also be implemented using software modules operating on an operating system of a computer constituting the server 1. The manager 122, the storage section 123, the storage section 126, and the manager 127 can be realized with associated database products and/or software modules that store the system state and the virtual server images in the memory. The holder 125 can be materialized using a memory area to temporarily keep therein the resource information of the allocation objective server.

The receiver 104, the manager 105, the storage section 106, and the comparator 107 are equivalent to those of the first embodiment.

A physical server 2 differs from that of the first embodiment in the function of the management agent 211. The agent 211 includes, in addition to the functions of the first embodiment, a function to attain performance and load information of hardware and software from the virtual machine monitor 202 and the respective virtual servers 203 and 204 to deliver the information to the module 121 of the server 1.

The terminal 3 and the network 4 are almost the same as those of the first embodiment.

Referring now to a flowchart, description will be given in detail of a general operation of the second embodiment.

Assume that none of the virtual servers is operating on any physical server 2 or one or more virtual servers are operating and each of these virtual servers is a virtual server for business use 203. In other words, none of the performance measurement virtual servers 204 is operating in any physical server 2. In this situation, the management agent 211 of each physical server 2 obtains performance and load information of the hardware and software from the virtual machine monitor 202 and the virtual servers 203 to feed the information as system state information to the monitor 121 of the server 1. The monitor 121 receives the state information from the agent 211 of one of the physical servers 2 to store the information via the state manager 122 in the state storage section 123.

Description will now be given of an operation in this state wherein the system manager stores resource information of allocation objective virtual servers via the terminal 3 in the holder 125 and then inputs a performance measurement request from the terminal 3.

Figure 7:
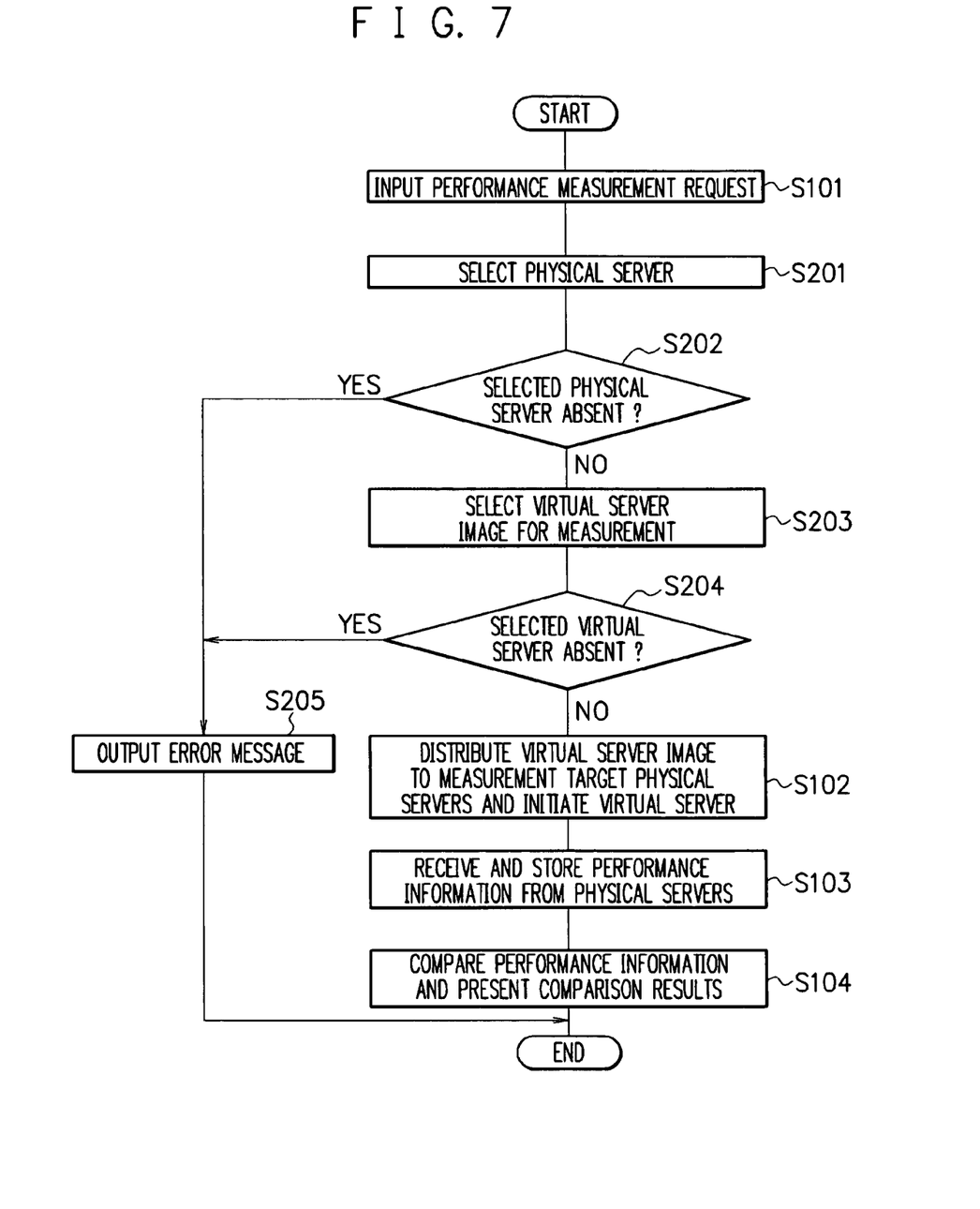
FIG. 7 is a flowchart showing an example of processes in the management server in the second embodiment.

The request inputted from the terminal 3 is delivered to the virtual server initiator 129 of the server 1 (step S101 of FIG. 7). The initiator 129 calls the selector 124 to select a physical server 2 for performance measurement (step S201). The selector 124 refers to the performance and load information of each physical server 2 stored in the storage section 123 to select, as a physical server 2 for performance measurement, a physical server 2 that can secure the resource required for the allocation objective virtual server held in the holder 125 and then notifies the virtual server initiator 129 of the selected physical server 2. If no physical server 2 is selected (yes in step S202), the initiator 129 displays an error message of the condition on the terminal 3 (step S205) and terminates the processing.

If one or more physical servers 2 are selected for the performance measurement (no in step S202), the virtual server initiator 129 calls the image selector 128 to select a performance measurement virtual server image for the measurement (step S203). The image selector 128 reads out from the holder 125 the operating system type and the application type of the allocation objective virtual server and then acquires from the correspondence table of FIG. 6 a virtual server image identifier corresponding to the operating system type and the application type. The image selector 128 reads out a virtual server image having the identifier from the storage section 126 to deliver the image to the initiator 129. If such virtual server image is absent, the selector 128 notifies the initiator 129 of the condition. That is, if the virtual server image has not been selected (yes in step S204), the server initiator 129 displays an error message indicating the condition on the terminal 3 (step S205) and terminates the processing.

If a virtual server image has been selected by the selector 128 (no in step S204), the initiator 129 distributes the virtual server image via the network 4 to the physical server 2 selected by the server selector 124 to request activation of the server image (step S102). The initiator 129 then delivers a list of identifiers of the physical servers 2 for performance measurement to the receiver 104. Operations of the management server 1 and the physical servers 2 after this point are equivalent to that of the first embodiment.

Next, description will be given of advantages of the second exemplary embodiment.

In accordance with the exemplary embodiment, in a virtual server environment where one or more virtual servers on physical servers 2 runs, it is possible to measure a margin of processing performance of physical servers 2 at a predetermined point of time based on one and the same criterion for the following reason. Using the same virtual server image including an operating system and a performance measurement program, a performance measurement virtual server 204 is activated on physical servers 2 to measure performance information.

Further, a physical server 2 capable of securing a resource required for an allocation objective virtual server is selected, physical servers 2 not capable of securing a required resource are excluded. Consequently, it is advantageously possible to avoid unnecessary execution of the performance measurement program.

Furthermore, a performance measurement virtual server image including an operating system substantially equal to an operating system of the allocation objective virtual server is selected. Therefore, there is obtained performance information quite similar to information of performance obtained at actual execution.

Furthermore, a performance measurement virtual server image including a performance measurement program for obtaining performance information suited to characteristics of applications for a virtual sever is selected. Therefore, there is obtained performance information quite similar to information of performance obtained at actual execution.

In the embodiment, the resource information of the allocation objective server to be stored in the holder 125 and the performance measurement request are supplied from the terminal 3. However, the system may be configured such that the resource information and the request are supplied from a program running on the server 1. In this situation, the comparator 107 may notify the program of the comparison result.

Although the embodiment includes the physical server selector 124 and the image selector 128, the system may be constructed to include either one of the selectors. If the physical server selector 124 is omitted, the physical server 2 for measurement is designated by the measurement request as in, for example, the first embodiment. If the image selector 128 is omitted, there is used one type of performance measurement virtual server image as in the first embodiment.

Third Exemplary Embodiment

A management server apparatus may include an allocation objective server information storage module that stores resource information of an allocation objective virtual server, a system state storage module that stores resource information of each physical server and resource information of each virtual server on each physical server, and a physical server selecting module that refers to the allocation objective server information storage module and the system state storage module and thereby selecting, as a target of performance measurement, a physical server including a resource required for the allocation objective virtual server.

Fourth Exemplary Embodiment

The management server apparatus may further includes an allocation objective server information storage module that stores resource information of an allocation objective virtual server, a virtual server image storage module that stores virtual server images between which at least either one of an operating system and a performance measurement program differs, and an image selecting module that selects, from the virtual server images stored in the virtual server image storage module, a virtual server image suitable for a resource included in the allocation objective virtual server.

Fifth Exemplary Embodiment

The management server apparatus may further include a performance information storage module that stores performance information of each physical server received by the performance information receiving module and a performance information comparing module that compares the performance information stored in the performance information storage module with each other.

Sixth Exemplary Embodiment

In the performance measuring method, the first step may include referring to an allocation objective server information storage module having stored resource information of the allocation objective virtual server and a system state storage module having stored resource information of each physical server and resource information of each virtual server on each physical server, and selecting, as a target of performance measurement, a physical server including a resource required for the allocation objective virtual server.

Seventh Exemplary Embodiment

In the performance measuring method, the first step may include referring to an allocation objective server information storage module having stored resource information of the allocation objective virtual server, and selecting a virtual server image suitable for a resource included in the allocation objective virtual server from a virtual server image storage module having stored virtual server images between which at least either one of an operating system and a performance measurement program differs.

The present invention is not restricted by the embodiments, but the embodiments may be changed and modified in various ways. For example, the management server 1 is not necessarily a physically separated computer. That is, a computer constituting one of the physical servers 2 may be adopted as the server 1. The function of the server 1 may be configured by hardware. or by use of a computer and programs as described above. The programs are recorded in a computer-readable recording medium, e.g., a magnetic disk or a semiconductor memory to be provided to a user. When a computer or the like is booted, the programs are read out and stored in a memory. The programs supervise operations of the computer so that the computer provides the functions of the management server 1 of the embodiments to thereby execute the procedures.

As set forth above, in a virtual server environment to operate virtual servers on physical servers, the performance measurement virtual server is activated to measure performance information on physical servers by use of a virtual server image including an operating system and a performance measurement program. This leads to an advantage that a margin of processing performance of each physical server can be measured according to the same, common criterion.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A management server apparatus communicably connected to physical servers on which a virtual server operates, comprising:
  a virtual server initiating module that delivers a virtual server image including an operating system and a performance measurement program and issues a request to a plurality of physical servers that are targets of performance measurement to activate a performance measurement virtual server for performance measurement based on said distributed virtual server image including an operating system and a performance measurement program;
  a performance information receiving module that receives from each physical server performance information measured by the performance measurement virtual server; and
  a storage medium that stores performance information of each of the physical servers;
  a physical server selecting module that selects, as a target of performance measurement, at least one physical server including a resource required for an allocation objective virtual server;
  a virtual server image storage module that stores virtual server images between which at least either one of an operating system and a performance measurement program differs; and
  an image selecting module that selects, from the virtual server images stored in the virtual server image storage module, a virtual server image suitable for changing performance measurement;
  said virtual server initiating module that delivers said virtual server image to said at least one physical server selected by said physical server selecting module and issues a request to said at least one physical server to activate a performance measurement virtual server for performance measurement based on said distributed virtual server image.

2. The management server apparatus in accordance with claim 1, further comprising:
  an allocation objective server information storage module that stores resource information of the allocation objective virtual server; and
  a system state storage module that stores resource information of each physical server and resource information of each virtual server on each physical server.

3. The management server apparatus in accordance with claim 1, further comprising:
  an allocation objective server information storage module that stores resource information of the allocation objective virtual server.

4. The management server apparatus in accordance with claim 1; further comprising:
  a performance information storage module that stores performance information of each physical server received by the performance information receiving module; and
  a performance information comparing module that compares the performance information stored in the performance information storage module with each other.

5. A computer system, comprising:
  a plurality of physical servers on which a virtual server operates; and
  a management server apparatus communicably connected to the physical servers, wherein the management server comprises:
  a virtual server initiating module that delivers a virtual server image including an operating system and a performance measurement program and issues a request to at least one physical server selected from the physical servers that are targets of performance measurement to activate a performance measurement virtual server for performance measurement based on said virtual server image including an operating system and a performance measurement program; and
  a performance information receiving module that receives performance information measured by the performance measurement virtual server from each physical server;
  a physical server selecting module that selects, as a target of performance measurement, at least one physical server including a resource required for an allocation objective virtual server;
  a virtual server image storage module that stores virtual server images between which at least either one of an operating system and a performance measurement program differs; and
  an image selecting module that selects, from the virtual server images stored in the virtual server image storage module, a virtual server image suitable for changing performance measurement;
  said virtual server initiating module that delivers said virtual server image to said at least one physical server selected by said physical server selecting module and issues a request to said at least one physical server to activate a performance measurement virtual server for performance measurement based on said distributed virtual server image.

6. A performance measuring method of measuring, by a computer communicably connected to physical servers on which a virtual server operates, performance of the physical servers, comprising:
  a first step of delivering a virtual server image including an operating system and a performance measurement program and issuing a request by the computer to physical servers that are targets of performance measurement to activate a performance measurement virtual server for performance measurement based on said virtual server image including an operating system and a performance measurement program; and a second step of receiving from each physical server performance information measured by the performance measurement virtual server;

a third step of selecting, as a target of performance measurement, at least one physical server including a resource required for an allocation objective virtual server;

a fourth step of storing virtual server images between which at least either one of an operating system and a performance measurement program differs;

a fifth step of selecting, from the stored virtual server images, a virtual server image suitable for changing performance measurement; and a sixth step of delivering said virtual server image to said at least one physical server selected by said third step and issues a request to said at least one physical server to activate a performance measurement virtual server for performance measurement based on said distributed virtual server image.

7. The performance measuring method in accordance with claim 6, wherein the first step further comprises:

referring to an allocation objective server information storage module having stored resource information of the allocation objective virtual server and a system state storage module having stored resource information of each physical server and resource information of each virtual server on each physical server; and selecting, as a target of performance measurement, a physical server including a resource required for the allocation objective virtual server; and delivering said virtual server image to said physical servers and issuing a request to said physical servers to activate a performance measurement virtual server for performance measurement based on said distributed virtual server image.

8. The performance measuring method in accordance with claim 6, wherein the first step comprises:

referring to an allocation objective server information storage module having stored resource information of the allocation objective virtual server; and selecting a virtual server image suitable for a resource included in the allocation objective virtual server from a virtual server image storage module having stored server images between which at least either one of an operating system and a performance measurement program differs;

delivering said virtual server image to said physical servers and issuing a request to said physical servers to activate a performance measurement virtual server for performance measurement based on said distributed virtual server image.

9. A non-transitory computer readable medium storing computer program product for causing a computer communicably connected to a plurality of physical servers on which a virtual server operates to perform:

first processing for delivering a virtual server image including an operating system and a performance measurement program and issuing a request to physical servers that are targets of performance measurement to activate a performance measurement virtual server for performance measurement based on a virtual server image including an operating system and a performance measurement program;

second processing for receiving from each physical server performance information measured by the performance measurement virtual server;

third processing for selecting, as a target of performance measurement, at least one physical server including a resource required for an allocation objective virtual server;

fourth processing for storing virtual server images between which at least either one of an operating system and a performance measurement program differs;

fifth processing for selecting, from the stored virtual server images, a virtual server image suitable for changing performance measurement; and sixth processing for delivering said virtual server image to said at least one physical server selected by said third step and issues a request to said at least one physical server to activate a performance measurement virtual server for performance measurement based on said distributed virtual server image.

10. The non-transitory computer readable medium in accordance with claim 9, wherein the first processing comprises processing for referring to an allocation objective server information storage module having stored resource information of the allocation objective virtual server and a system state storage module having stored resource information of each physical server and resource information of each virtual server on each physical server and for selecting, as a target of performance measurement, a physical server including a resource required for the allocation objective virtual server, and delivering said virtual server image to said physical servers and issuing a request to said physical servers to activate a performance measurement virtual server for performance measurement based on said distributed virtual server image.

11. The non-transitory computer readable medium in accordance with claim 9, wherein the first processing comprises processing for referring to an allocation objective server information storage module having stored resource information of the allocation objective virtual server and for selecting a virtual server image suitable for a resource included in the allocation objective virtual server from a virtual server image storage module having stored virtual server images between which at least either one of an operating system and a performance measurement program differs, and delivering said virtual server image to said physical servers and issuing a request to said physical servers to activate a performance measurement virtual server for performance measurement based on said distributed virtual server image.

12. A management server apparatus communicably connected to a plurality of physical servers on which a virtual server operates, comprising:

virtual server initiating means for delivering a virtual server image including an operating system and a performance measurement program and issuing a request to a plurality of physical servers as targets of performance measurement to initiate a performance measurement virtual server for performance measurement on the basis of one and the same virtual server image including an operating system and a performance measurement program;

performance information receiving means for receiving performance information measured by the performance measurement virtual server, from each physical server;

physical server selecting means for selecting, as a target of performance measurement, at least one physical server including a resource required for an allocation objective virtual server;

virtual server image storage means for storing virtual server images between which at least either one of an operating system and a performance measurement program differs; and image selecting means for selecting, from the virtual server images stored by the virtual server image storage means, a virtual server image suitable for changing performance measurement, wherein said virtual server initiating means delivers said virtual server image to said at least one physical server selected by said physical server selecting means and issues a request to said at least one physical server to activate a performance measurement virtual server for performance measurement based on said distributed virtual server image.

13. A computer system, comprising:

a plurality of physical servers on which a virtual server operates; and a management server apparatus communicably connected to the physical servers, wherein the management server comprises:

virtual server initiating means for delivering a virtual server image including an operating system and a performance measurement program and issuing a request to at least one physical server selected from the physical servers that are targets of performance measurement to activate a performance measurement virtual server for performance measurement based on said virtual server image including an operating system and a performance measurement program; and performance information receiving means for receiving performance information measured by the performance measurement virtual server from each physical server;

physical server selecting means for selecting, as a target of performance measurement, at least one physical server including a resource required for an allocation objective virtual server;

virtual server image storage means for storing virtual server images between which at least either one of an operating system and a performance measurement program differs; and image selecting means for selecting, from the virtual server images stored by the virtual server image storage means, a virtual server image suitable for changing performance measurement, wherein said virtual server initiating means delivers said virtual server image to said at least one physical server selected by said physical server selecting means and issues a request to said at least one physical server to activate a performance measurement virtual server for performance measurement based on said distributed virtual server image.

\* \* \* \* \*